(12) United States Patent
McCarthy et al.

(10) Patent No.: US 8,699,114 B2
(45) Date of Patent: Apr. 15, 2014

(54) MULTIFUNCTIONAL BUILDING COMPONENT

(75) Inventors: Wil McCarthy, Lakewood, CO (US); Richard M. Powers, Lakewood, CO (US); Alex K. Burney, Denver, CO (US)

(73) Assignee: Ravenbrick LLC, Denver, CO (US)

( * ) Notice: Subject to any disclaimer, the term of this patent is extended or adjusted under 35 U.S.C. 154(b) by 282 days.

(21) Appl. No.: 13/150,475

(22) Filed: Jun. 1, 2011

(65) Prior Publication Data

US 2011/0292488 A1    Dec. 1, 2011

Related U.S. Application Data

(60) Provisional application No. 61/350,462, filed on Jun. 1, 2010.

(51) Int. Cl.
G02F 1/15    (2006.01)

(52) U.S. Cl.
USPC .......................................... 359/265

(58) Field of Classification Search
USPC ................... 359/265, 634; 250/517.1
See application file for complete search history.

(56) References Cited

U.S. PATENT DOCUMENTS

| | | |
|---|---|---|
| 3,990,784 A | 11/1976 | Gelber |
| 4,006,730 A | 2/1977 | Clapham |
| 4,155,895 A | 5/1979 | Rohowetz |
| 4,268,126 A | 5/1981 | Mumford |
| 4,456,335 A | 6/1984 | Mumford |
| 4,475,031 A | 10/1984 | Mockovciak, Jr. |
| 4,491,390 A | 1/1985 | Tong-Shen |
| 4,512,638 A | 4/1985 | Sriram et al. |
| 4,579,638 A | 4/1986 | Scherber |
| 4,640,583 A | 2/1987 | Hoshikawa et al. |
| 4,641,922 A | 2/1987 | Jacob |
| 4,688,900 A | 8/1987 | Doane et al. |
| 4,688,901 A | 8/1987 | Albert |
| 4,755,673 A | 7/1988 | Pollack et al. |
| 4,756,758 A | 7/1988 | Lent |
| 4,783,150 A | 11/1988 | Tabony |
| 4,789,500 A | 12/1988 | Morimoto et al. |
| 4,804,254 A | 2/1989 | Doll et al. |
| 4,848,875 A | 7/1989 | Baughman et al. |
| 4,859,994 A | 8/1989 | Zola |
| 4,871,220 A | 10/1989 | Kohin |
| 4,877,675 A | 10/1989 | Falicoff et al. |
| 4,893,902 A | 1/1990 | Baughman et al. |

(Continued)

FOREIGN PATENT DOCUMENTS

| | | |
|---|---|---|
| CA | 2620005 | 7/2008 |
| CN | 1189224 A | 7/1998 |

(Continued)

OTHER PUBLICATIONS

Author Unknown, "Liquid Crystal Research", http://chirality.swarthmore.edu, printed Aug. 21, 2009.

(Continued)

*Primary Examiner* — Joseph P Martinez
(74) *Attorney, Agent, or Firm* — Dorsey & Whitney LLP

(57) ABSTRACT

A multifunctional building component is capable of serving as one or more of a window, a wall, a shading device, a roofing element, a color panel, a display, and an energy harvesting, storage, and distribution element.

20 Claims, 4 Drawing Sheets

(56) References Cited

U.S. PATENT DOCUMENTS

| | | |
|---|---|---|
| 4,899,503 A | 2/1990 | Baughman et al. |
| 4,964,251 A | 10/1990 | Baughman et al. |
| 5,009,044 A | 4/1991 | Baughman et al. |
| 5,013,918 A | 5/1991 | Choi |
| 5,025,602 A | 6/1991 | Baughman et al. |
| 5,111,629 A | 5/1992 | Baughman et al. |
| 5,132,147 A | 7/1992 | Takiguchi |
| 5,152,111 A | 10/1992 | Baughman et al. |
| 5,193,900 A | 3/1993 | Yano et al. |
| 5,196,705 A | 3/1993 | Ryan |
| 5,197,242 A | 3/1993 | Baughman et al. |
| 5,212,584 A | 5/1993 | Chung |
| 5,227,115 A | 7/1993 | Harnischfeger |
| 5,274,246 A | 12/1993 | Hopkins |
| 5,304,323 A | 4/1994 | Arai et al. |
| 5,308,706 A | 5/1994 | Kawaguchi et al. |
| 5,319,478 A | 6/1994 | Funfschilling et al. |
| 5,347,140 A | 9/1994 | Hirai |
| 5,377,042 A | 12/1994 | Chahroudt |
| 5,481,400 A | 1/1996 | Borden |
| 5,525,430 A | 6/1996 | Chahroudi |
| 5,530,263 A | 6/1996 | DiVincenzo |
| 5,574,286 A | 11/1996 | Huston et al. |
| 5,585,640 A | 12/1996 | Huston |
| 5,757,828 A | 5/1998 | Ouchi |
| 5,763,307 A | 6/1998 | Wang |
| 5,881,200 A | 3/1999 | Burt |
| 5,889,288 A | 3/1999 | Futatsugi |
| 5,897,957 A | 4/1999 | Goodman |
| 5,937,295 A | 8/1999 | Chen |
| 5,940,150 A | 8/1999 | Faris et al. |
| 6,040,859 A | 3/2000 | Takahashi |
| 6,099,758 A | 8/2000 | Verrall et al. |
| 6,122,103 A | 9/2000 | Perkins et al. |
| 6,208,463 B1 | 3/2001 | Hansen |
| 6,218,018 B1 | 4/2001 | McKown et al. |
| 6,226,067 B1 | 5/2001 | Nishiguchi |
| 6,240,114 B1 | 5/2001 | Anselm |
| 6,260,414 B1 | 7/2001 | Brown |
| 6,281,519 B1 | 8/2001 | Sugiyama et al. |
| 6,288,840 B1 | 9/2001 | Perkins et al. |
| 6,294,794 B1 | 9/2001 | Yoshimura et al. |
| 6,304,784 B1 | 10/2001 | Allee |
| 6,320,220 B1 | 11/2001 | Watanabe |
| 6,329,668 B1 | 12/2001 | Razeghi |
| 6,333,516 B1 | 12/2001 | Katoh |
| 6,381,068 B1 | 4/2002 | Harada |
| 6,437,361 B1 | 8/2002 | Matsuda |
| 6,446,402 B1 | 9/2002 | Byker |
| 6,486,997 B1 | 11/2002 | Bruzzone et al. |
| 6,487,112 B1 | 11/2002 | Wasshuber |
| 6,493,482 B1 | 12/2002 | Al-hemyari et al. |
| 6,498,354 B1 | 12/2002 | Jefferson |
| 6,504,588 B1 | 1/2003 | Kaneko |
| 6,512,242 B1 | 1/2003 | Fan et al. |
| 6,559,903 B2 | 5/2003 | Faris et al. |
| 6,583,827 B2 | 6/2003 | Faris et al. |
| 6,600,169 B2 | 7/2003 | Stintz et al. |
| 6,611,640 B2 | 8/2003 | LoCasclo |
| 6,635,898 B2 | 10/2003 | Williams |
| 6,661,022 B2 | 12/2003 | Morie |
| 6,671,008 B1 | 12/2003 | Li et al. |
| 6,710,823 B2 | 3/2004 | Faris et al. |
| 6,718,086 B1 | 4/2004 | Ford |
| 6,730,909 B2 | 5/2004 | Butler |
| 6,753,273 B2 | 6/2004 | Holonyak, Jr. |
| 6,770,916 B2 | 8/2004 | Ohshima |
| 6,777,718 B2 | 8/2004 | Takagi |
| 6,816,525 B2 | 11/2004 | Stintz |
| 6,847,662 B2 | 1/2005 | Bouda |
| 6,859,114 B2 | 2/2005 | Eleftheriades |
| 6,912,018 B2 | 6/2005 | Faris et al. |
| 6,926,952 B1 | 8/2005 | Weber et al. |
| 6,933,812 B2 | 8/2005 | Sarabandi |
| 6,946,697 B2 | 9/2005 | Pietambaram |
| 6,963,435 B2 | 11/2005 | Mallya |
| 6,965,420 B2 | 11/2005 | Li et al. |
| 6,978,070 B1 | 12/2005 | McCarthy et al. |
| 6,985,291 B2 | 1/2006 | Watson |
| 6,992,822 B2 | 1/2006 | Ma |
| 7,026,641 B2 | 4/2006 | Mohseni |
| 7,038,745 B2 | 5/2006 | Weber et al. |
| 7,042,615 B2 | 5/2006 | Richardson |
| 7,046,441 B2 | 5/2006 | Huang |
| 7,068,234 B2 | 6/2006 | Sievenpiper |
| 7,099,062 B2 | 8/2006 | Azens et al. |
| 7,113,335 B2 | 9/2006 | Sales |
| 7,133,335 B2 | 11/2006 | Nishimura et al. |
| 7,154,451 B1 | 12/2006 | Sievenpiper |
| 7,161,737 B2 | 1/2007 | Umeya |
| 7,166,797 B1 | 1/2007 | Dziendziel et al. |
| 7,221,827 B2 | 5/2007 | Domash et al. |
| 7,245,431 B2 | 7/2007 | Watson |
| 7,276,432 B2 | 10/2007 | McCarthy et al. |
| 7,300,167 B2 | 11/2007 | Fernando et al. |
| 7,318,651 B2 | 1/2008 | Chua |
| 7,351,346 B2 | 4/2008 | Little |
| 7,385,659 B2 | 6/2008 | Kotchick |
| 7,470,925 B2 | 12/2008 | Tamura |
| 7,522,124 B2 | 4/2009 | Smith |
| 7,532,397 B2 | 5/2009 | Tanaka |
| 7,538,946 B2 | 5/2009 | Smith |
| 7,561,332 B2 | 7/2009 | Little |
| 7,601,946 B2 | 10/2009 | Powers |
| 7,619,816 B2 | 11/2009 | Deng |
| 7,655,942 B2 | 2/2010 | McCarthy |
| 7,692,180 B2 | 4/2010 | Snyder |
| 7,755,829 B2 | 7/2010 | Powers et al. |
| 7,768,693 B2 | 8/2010 | McCarthy et al. |
| 7,911,563 B2 | 3/2011 | Hung |
| 7,936,500 B2 | 5/2011 | Powers |
| 7,977,621 B2 | 7/2011 | McCarthy |
| 8,072,672 B2 | 12/2011 | Powers |
| 8,076,661 B2 | 12/2011 | McCarthy |
| 8,169,685 B2 | 5/2012 | Powers |
| 8,271,241 B2 | 9/2012 | Akyurtlu |
| 8,284,336 B2 | 10/2012 | Powers |
| 2002/0079485 A1 | 6/2002 | Stintz et al. |
| 2002/0080842 A1 | 6/2002 | An |
| 2002/0085151 A1 | 7/2002 | Faris et al. |
| 2002/0114367 A1 | 8/2002 | Stintz et al. |
| 2002/0118328 A1 | 8/2002 | Faris |
| 2002/0141029 A1 | 10/2002 | Carlson |
| 2002/0152191 A1 | 10/2002 | Hollenberg |
| 2002/0180916 A1 | 12/2002 | Schadt et al. |
| 2002/0190249 A1 | 12/2002 | Williams |
| 2003/0052317 A1 | 3/2003 | Ohshima |
| 2003/0059998 A1 | 3/2003 | Holonyak, Jr. |
| 2003/0066998 A1 | 4/2003 | Lee |
| 2003/0107813 A1 | 6/2003 | Clabburn |
| 2003/0107927 A1 | 6/2003 | Yerushalmi |
| 2003/0129247 A1 | 7/2003 | Ju et al. |
| 2003/0138209 A1 | 7/2003 | Chan |
| 2003/0218712 A1 | 11/2003 | Kumar et al. |
| 2003/0227663 A1* | 12/2003 | Agrawal et al. ............ 359/265 |
| 2004/0005451 A1 | 1/2004 | Kretman |
| 2004/0012749 A1 | 1/2004 | Freeman |
| 2004/0036993 A1 | 2/2004 | Tin |
| 2004/0256612 A1 | 12/2004 | Mohseni |
| 2005/0068629 A1 | 3/2005 | Fernando et al. |
| 2005/0185125 A1 | 8/2005 | Miyachi |
| 2005/0221128 A1 | 10/2005 | Kochergin |
| 2005/0271092 A1 | 12/2005 | Ledentsov |
| 2006/0011904 A1 | 1/2006 | Snyder et al. |
| 2006/0147810 A1 | 7/2006 | Koch |
| 2006/0151775 A1 | 7/2006 | Hollenberg |
| 2006/0238867 A1 | 10/2006 | Takeda |
| 2006/0257090 A1 | 11/2006 | Podolskiy |
| 2006/0262398 A1 | 11/2006 | Sangu et al. |
| 2006/0274218 A1 | 12/2006 | Xue |
| 2007/0070276 A1 | 3/2007 | Tan |
| 2007/0121034 A1 | 5/2007 | Ouderkirk |
| 2007/0215843 A1 | 9/2007 | Soukoulis et al. |
| 2007/0279727 A1 | 12/2007 | Gandhi |

(56) References Cited

U.S. PATENT DOCUMENTS

| | | |
|---|---|---|
| 2008/0013174 A1 | 1/2008 | Allen |
| 2008/0061222 A1 | 3/2008 | Powers et al. |
| 2008/0117500 A1 | 5/2008 | Narendran et al. |
| 2008/0138543 A1 | 6/2008 | Hoshino |
| 2008/0160321 A1 | 7/2008 | Padiyath et al. |
| 2008/0204383 A1 | 8/2008 | McCarthy et al. |
| 2008/0210893 A1 | 9/2008 | McCarthy et al. |
| 2008/0246388 A1 | 10/2008 | Cheon |
| 2008/0259254 A1 | 10/2008 | Kikuchi et al. |
| 2009/0015902 A1 | 1/2009 | Powers et al. |
| 2009/0040132 A1 | 2/2009 | Sridhar |
| 2009/0059406 A1 | 3/2009 | Powers et al. |
| 2009/0128893 A1 | 5/2009 | McCarthy et al. |
| 2009/0128907 A1 | 5/2009 | Takahashi |
| 2009/0167971 A1 | 7/2009 | Powers et al. |
| 2009/0219603 A1 | 9/2009 | Xue |
| 2009/0268273 A1 | 10/2009 | Powers et al. |
| 2009/0296190 A1 | 12/2009 | Anderson |
| 2010/0001008 A1 | 1/2010 | McCarthy et al. |
| 2010/0015363 A1 | 1/2010 | Chiang et al. |
| 2010/0027099 A1 | 2/2010 | McCarthy |
| 2010/0045924 A1 | 2/2010 | Powers et al. |
| 2010/0051898 A1 | 3/2010 | Kim, II |
| 2010/0060844 A1 | 3/2010 | Sawatari et al. |
| 2010/0118380 A1 | 5/2010 | Xue |
| 2010/0232017 A1 | 9/2010 | McCarthy et al. |
| 2010/0259698 A1 | 10/2010 | Powers et al. |
| 2010/0271686 A1 | 10/2010 | Powers et al. |
| 2010/0288947 A1 | 11/2010 | McCarthy et al. |
| 2011/0025934 A1 | 2/2011 | McCarthy et al. |
| 2011/0044061 A1 | 2/2011 | Santoro |
| 2011/0102878 A1 | 5/2011 | McCarthy et al. |
| 2012/0140311 A1 | 6/2012 | Powers et al. |
| 2012/0262773 A1 | 10/2012 | Powers et al. |
| 2013/0033738 A1 | 2/2013 | Powers et al. |

FOREIGN PATENT DOCUMENTS

| | | |
|---|---|---|
| CN | 1350648 | 5/2002 |
| CN | 1494091 | 5/2004 |
| EP | 1162496 | 12/2001 |
| GB | 2261989 | 6/1993 |
| JP | 49-94145 | 6/1974 |
| JP | 58010717 | 1/1983 |
| JP | 59-231516 | 12/1984 |
| JP | 61223719 | 10/1986 |
| JP | 1178517 | 7/1989 |
| JP | 02-089426 | 3/1990 |
| JP | 06-158956 | 6/1994 |
| JP | 07-043526 | 2/1995 |
| JP | 08-015663 | 1/1996 |
| JP | 09-124348 | 5/1997 |
| JP | 63-127594 | 8/1998 |
| JP | 10-287449 | 10/1998 |
| JP | 10-311189 | 11/1998 |
| JP | 2002-520677 | 7/2002 |
| JP | 2002-357815 | 12/2002 |
| JP | 2003-248204 | 9/2003 |
| JP | 2004-004795 | 1/2004 |
| JP | 2004-291345 | 10/2004 |
| JP | 2005-250119 | 9/2005 |
| JP | 2006-243485 | 9/2006 |
| JP | 2006-285242 | 10/2006 |
| JP | 2007-515661 | 6/2007 |
| JP | 2007-272016 | 10/2007 |
| JP | 2008-530766 | 8/2008 |
| KR | 2002-0044153 | 6/2002 |
| KR | 2003-0072578 | 9/2003 |
| KR | 2004-48916 | 6/2004 |
| KR | 10-2004-0108816 | 12/2004 |
| KR | 10-2006-0000059 | 1/2006 |
| KR | 10-2007-0091314 | 9/2007 |
| KR | 10-2010-0039401 | 4/2010 |
| WO | 94/02313 | 2/1993 |
| WO | 97/01789 | 1/1997 |
| WO | 01/23173 | 4/2001 |
| WO | 02/064937 | 8/2002 |
| WO | 03/029885 | 4/2003 |
| WO | 03/096105 | 11/2003 |
| WO | 2005/031437 | 4/2005 |
| WO | WO 2006/023195 | 2/2006 |
| WO | 2006/088369 | 8/2006 |
| WO | WO 2008/092038 | 7/2008 |
| WO | 2008/106596 | 9/2008 |
| WO | 2008/144217 | 11/2008 |

OTHER PUBLICATIONS

Barbagallo, S., et al., "Synthesis of novel metamaterials," Chapter 2 (VDM Verlag 2008).

Eleftheriades, G.V., et al. (Editors); IYERS, "Negative-Refraction Metamaterials," Chapter 1 (Wiley 2005), pp. 4-5, 16-30, 321-330.

Fedotov, V. A., et al., "Asymmetric Propagation of Electromagnetic Waves through a Planar Chiral Structure," The American Physical Society, PRL 97, Oct. 20, 2006, pp. 167401-1-167401-4.

Ginley, D. S., et al., "Transparent Conducting Oxides," MRS Bulletin, Aug. 2000, pp. 15-18.

Goldhaber-Gordon, David, et al., "Overview of Nanoelectronic Devices," Proceedings of the IEEE, vol. 85, No. 4, (Apr. 1997), pp. 521-533.

Hao, J. et al., "Manipulating Electromagnetic Wave Polarizations by Anisotropic Metamaterials," Physical Review Letters, 2007, vol. 99, No. 063908.

Harrison, "Quantum Wells, Wires, and Dots: Theoretical & Computational Physics of Semiconductor Nanostructures" 2nd Edition, John Wiley & Sons, LTD (2005), 3 pages.

Lan, S., et al., "Survey on Roller-type Nanoimprint Lithography (RNIL) Process," International Conference on Smart Manufacturing Application, Apr. 9-11, 2008, in KINTEX, Gyeonggi-do, Korea, pp. 371-376.

Leatherdale, C.A., et al., "Photoconductivity in CdSe Quantum Dot Solids," Physical Review B, vol. 62, No. 4, (Jul. 15, 2000) pp. 2669-2680.

Manea, E., et al., "Optical Characterization of SnO2 thin Films Prepared by Sol Gel Method, for 'Honeycomb' Textured Silicon Solar Cells," International Semiconductor Conference, 2006, vol. 1, Issue, Sep. 2006, pp. 179-182.

Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.

Padilla, W.J., et al., "Electrically resonant terahertz metamaterials: Theoretical and experimental investigations," Physical Review B 75, 041102(R) (2007).

Rogacheva, A.V., et al., "Giant gyrotropy due to electromagnetic-field coupling in a bilayered chiral structure," Physical Review Letters 97, 177401 (Oct. 27, 2006).

Sarychev, et al., "Negative refraction metamaterials," Chapter 8 (Wiley 2005).

Siegel, J. D., "The MSVD Low E 'Premium Performance' Myth," International Glass Review, Issue 1, 2002, pp. 55-58.

Sung, J. et al., "Dynamics of photochemical phase transition of guest/host liquid crystals with an Azobenzene derivative as a photoresponsive chromophore," Chemistry of Materials, vol. 14, No. 1, pp. 385-391, Jan. 21, 2002.

West, J. L. et al., "Characterization of polymer dispersed liquid-crystal shutters by ultraviolet/visible and infrared absorption spectroscopy," Journal of Applied Physics, vol. 70, No. 7, pp. 3785-3790, Oct. 1, 1991.

Zhang, W., Giant optical activity in dielectric planar metamaterials with two-dimensional chirality, Journal of Optics A: Pure and Applied Optics, 8, pp. 878-890 (2006).

Korean Intellectual Property Office as International Searching Authority, International Search Report and Written Opinion for International Application No. PCT/US2008/051959, Jun. 6, 2008, 10 pages.

(56) References Cited

OTHER PUBLICATIONS

Korean Intellectual Property Office as International Searching Authority, International Search Report and Written Opinion for International Application No. PCT/US2008/069881, Sep. 30, 2008, 10 pages.

Korean Intellectual Property Office as International Searching Authority, International Search Report and Written Opinion for International Application No. PCT/US2008/087964, Mar. 31, 2009, 12 pages.

Korean Intellectual Property Office as International Searching Authority, International Search Report and Written Opinion for International Application No. PCT/US2009/041576, Nov. 25, 2009, 7 pages.

Notice of Allowance, U.S. Appl. No. 12/019,602, dated Jun. 9, 2010 (now Pat. 7,768,693).

Notice of Allowance, U.S. Appl. No. 12/172,156, dated Mar. 11, 2010 (now Pat. 7,755,829).

Notice of Allowance, U.S. Appl. No. 12/843,218, dated Apr. 12, 2011.

Notice of Allowance, U.S. Appl. No. 12/830,068, dated Aug. 22, 2011.

Fan, et al., "Thin-film conducting microgrids as transparent heat mirrors", Appl. Phys. Lett., vol. 28, No. 8, Apr. 5, 1976, Apr. 5, 1976, 440-442.

Yamazaki, et al., "Polarisation-insensitive parametric wavelength conversion without tunable filters for converted light extraction", Eletronic Letters, IEE Stevenage, GB, vol. 42, No. 6, Mar. 16, 2006, 365-367.

Korean Intellectual Property Office as International Searching Authority, International Search Report and Written Opinion for International Application No. PCT/US2011/038722, Jan. 13, 2012, 8 pages.

* cited by examiner

MULTIFUNCTIONAL BUILDING COMPONENT

CROSS REFERENCE TO RELATED APPLICATIONS

This application claims the benefit of priority pursuant to 35 U.S.C. §119(e) of U.S. provisional application No. 61/350,462 filed 1 Jun. 2010 entitled "Multifunctional building component," which is hereby incorporated herein by reference in its entirety.

This application is related to U.S. Pat. Nos. 7,768,693, 7,755,829, and 7,936,500, and U.S. Patent Application Publication Nos. 2009/0128893, 2009/0167971, 2009/0268273, 2010/0045924, 2010/0232017, 2010/0259698, 2011/0025934, and 2011/0102878, and U.S. patent application Ser. No. 13/074,876, each of which is hereby incorporated herein by reference in its entirety.

BACKGROUND

1. Technical Field

The subject matter described herein relates to a multifunctional building component that has elements of, and is capable of acting as, a window, wall, skylight, and roofing material, that is capable of storing and releasing energy, and which may have additional functions.

2. Description of the Related Art

The problem of controlling the flow of light and heat through the skin of a building, vehicle, or other structure has previously been addressed using "static" technologies such as insulated windows and walls, fixed shading elements, and manually activated shading elements such as awnings, curtains, and window shades.

More recently, "smart" building elements have been disclosed by which the transport of energy through a building or vehicle skin can be varied. For example, window or wall devices are capable of transporting a large proportion of solar energy (light and heat) therethrough in a cold state and transporting a much smaller proportion of solar energy through therethrough in a hot state. The switching between states can be accomplished either passively (e.g., through the use of "smart" materials whose properties are temperature dependent) or actively (e.g., through the use of materials whose properties are switchable via an external stimulus such as UV light or an electric field). In the case of an electrically operated device, it may also include a photovoltaic power source. Such devices may also include a thermal energy storage medium or thermal mass, such as a phase-change material. Further, optical filters (e.g., reflective, absorptive, or diffusive) are known that may be controlled either thermally or electrically and can be used as window films or other light- and heat-regulating building materials.

The information included in this Background section of the specification, including any references cited herein and any description or discussion thereof, is included for technical reference purposes only and is not to be regarded as subject matter by which the scope of the invention is to be bound.

SUMMARY

A multifunctional building element as disclosed herein is capable of serving as, and blurs the traditional distinctions between, a window, a wall, a roofing element, a shading device, a color panel, and an energy harvesting and storage device. In one implementation, such a device may be composed of several basic elements, e.g., a structural element, a color-changing element, an insulation element, an energy-harvesting element, an optional energy storage element, and an energy distribution element.

The structural element may serve both to support the other elements in an effective arrangement, and to permit the attachment of the device to a building, vehicle, or other structure. The structural element may have multiple subcomponents that may, in general, resemble the structural elements or subcomponents of standard building materials including, but not limited to, glass panes, insulating glass unit spacers, polymer sheets, metal or ceramic plates, sealants, and fasteners. For example, if the device is intended to fit into a standard storefront or curtain wall framing system, then the structural element may closely resemble an insulating glass unit (IGU), spandrel, or infill panel. If the device is intended to fit into a brick or cinderblock wall, then the structural element may closely resemble a "glass block". If the device is a thin, flexible film, then the structural element may be, or may include, a pressure-sensitive adhesive (PSA) of the sort used to attach window films to glass.

The color-changing element may be capable of exhibiting two or more of the following: a substantially transparent state, a translucent tinted state, a substantially reflective state, a substantially diffusive state, and a substantially opaque state. The color-changing element may be a single element or may consist of a plurality of sub-elements (e.g., pixels), and may be triggered by a variety of influences including, but not limited to, heat, cold, electric fields, and UV light. A variety of electrochromic, electrotropic, thermochromic, thermotropic, magnetochromic, magnetotropic, photochromic, or phototropic materials or techniques may be employed here with substantially similar results.

The color-changing element may also serve a variety of functions as part of the device. For example, it may be used as a switchable or tunable attenuator for regulating the flow of solar energy (light and heat) through the building element, as a switchable or tunable privacy screen, as a switchable or tunable heat-absorbing element for capturing and storing solar energy, or as a switchable or tunable reflector for either rejecting solar energy or redirecting it to another surface or element (e.g., a photovoltaic cell). In addition, the color-changing element may be used to display colors, patterns, or images for aesthetic purposes or as a mode of communication or signage.

The insulation element may be used to prevent the unwanted transfer of heat (whether conductive, convective, or radiative) from one face of the multifunctional building element to the other. The insulation element may be composed of a variety of materials, including gases, gels, aerogels, foams, fibers, and solid ceramics. For many applications it may be highly desirable for the insulation element to be transparent or translucent, although this is not a defining requirement, and embodiments may be constructed where this is not the case. The insulation element may be integral to or enclosed within the structural element, as with the air gap(s) and low-emissivity coating(s) of an IGU, or may be mounted external to the structural element, as with the polymer foam backing found on many garage doors and wall panels.

The energy-harvesting element may serve to capture light energy and/or heat energy that would otherwise be wasted or rejected from the building or other structure, or that would otherwise pass unwanted into the building or structure and add, for example, to the cooling burden on an HVAC system. Exemplary forms of the energy harvesting element may include, but are not limited to, a photovoltaic cell or photovoltaic layer capable of obtaining electrical energy from sunlight, a thermoelectric cell or thermoelectric layer capable of obtaining electrical energy from temperature gradients, a piezoelectric cell or piezoelectric layer capable of obtaining electrical energy from sound and vibration, or a passive solar heating collector. The device may also include multiple energy harvesting sub-elements, whether of the same or of different types.

The optional energy storage element takes in the energy collected by the energy-harvesting element, and stores it for later use. In the case of thermal energy, the energy storage element may be a passive thermal mass such as water or concrete, or may be a phase-change material such as an ice, wax, or salt designed to store and release energy by melting and resolidifying at a predetermined temperature. In the case of electrical energy, the energy storage element may be a battery or capacitor, or may be an electromechanical system wherein electricity is converted into, and stored as, mechanical energy, as for example in a coiled watch spring.

The energy distribution element may make use of the energy gathered from the energy-harvesting element, and/or the energy stored in the optional energy storage element. In the case of stored thermal energy, the energy distribution element may be the same object or subsystem as the energy storage element. For example, a phase-change material is capable of both storing thermal energy and of releasing it at a later time (e.g., when the temperature outside the device has fallen below the temperature within the device). In the case of electrical energy, the energy distribution element may be extremely simple, as in the case of a pair of wires designed to carry electrical energy to a system or device external to the multifunctional building component, or may include more complex elements such as switches, inverters, sensors, DC-AC converters, and electronic logic circuits.

Alternatively or in addition, the energy distribution element may convert electrical energy into some other useful form. For example, a radiant heater may convert stored electrical energy into heat to warm the interior of the building or other structure, while a light-emitting diode array may convert stored electricity into visible light to illuminate the structure's interior or exterior at night, or to display images or information. This may be particularly useful as it allows the stored energy to be used within the device itself, as a standalone system, without the requirement to interconnect the device with external infrastructure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

DETAILED DESCRIPTION

Figure 1:
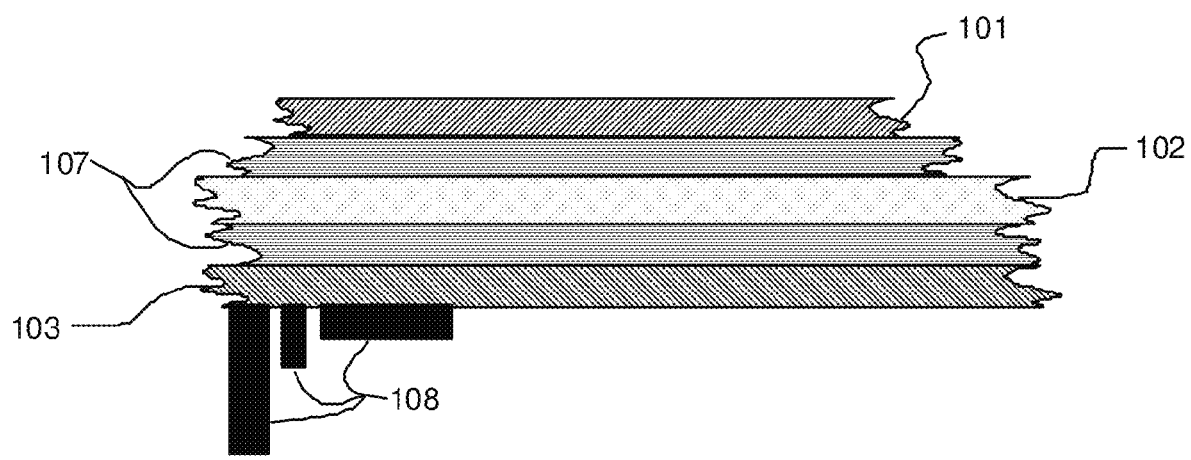
FIG. 1 is a schematic representation of an electrochromic or electroreflective optical filter.

FIG. 1 is a schematic representation of an electrochromic or electroreflective optical filter 100 composed of an electrotropic depolarizer 102, placed between a first polarizer 101 and a second polarizer 103, two transparent electrodes 107, and a control system 108, which collectively allow the filter 100 to change from a largely transparent state to a largely tinted or reflective state on the basis of electrical signals. The depolarizer 102 may be composed of a liquid crystal layer retained within the first and second polarizers 101, 103. The control system 108 may include such subcomponents as a temperature sensor, a power supply, and controller hardware. In an exemplary form, the control system 108 may be a thermostat and liquid crystal display (LCD) controller consisting of a thermocouple connected to a programmable microcontroller and powered by a small battery or photovoltaic cell. In this exemplary embodiment, when the sensed temperature falls below a threshold value, the control system applies an alternating current (AC) or direct current (DC) voltage between the transparent electrodes 107 to create an AC or DC electric field across the electrotropic depolarizer 102. The electric field alters the polarization properties of the depolarizer 102 (e.g., by reorienting liquid crystal molecules in the depolarizer) and the total light transmission of the filter changes accordingly.

Figure 2:
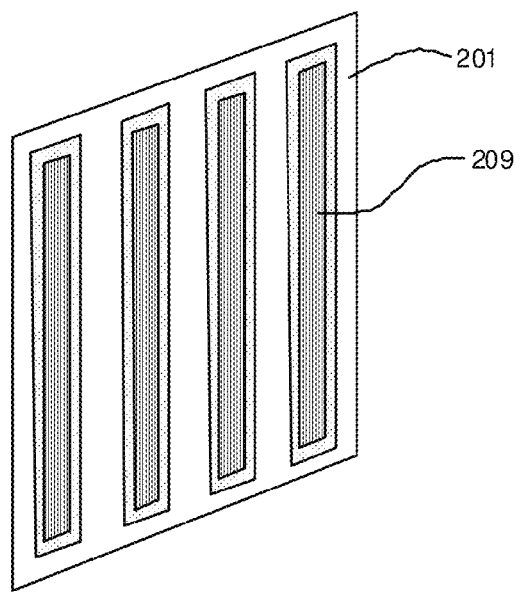
FIG. 2 is is a schematic representation of a device or component that serves as both a polarizer and a photovoltaic collector.

FIG. 2 is a schematic representation of a photovoltaic polarizer 200, wherein the conductive wires 209 of a wire grid polarizer 201 may be used to harvest photovoltaic energy. In an alternate embodiment, the conductive wires may be replaced with photovoltaic strips 209 (e.g., Shotkey-type diodes). In this arrangement, while the conductive wires 209 or photovoltaic strips 9 reflect a significant fraction of the incident light with opposite polarity, a significant fraction of this light is also absorbed in the form of electrical potentials which can be harvested to create an electrical current.

Figure 3:
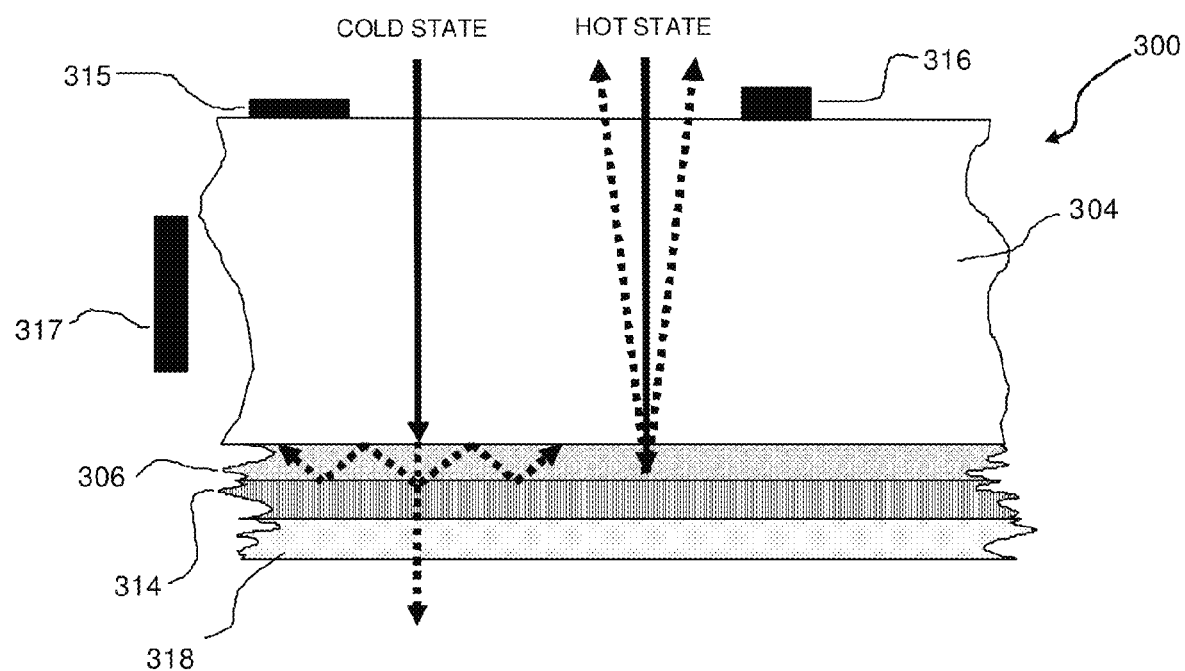
FIG. 3 is a schematic representation of a building element that has features of both a window and a wall.

FIG. 3 is a schematic representation of a "smart" building material 300 that has aspects of both a "smart window" and a "smart wall". In one exemplary implementation, the device may be composed of a transparent substrate 304, a thermochromic or electrochromic attenuator 306, a power supply 315, a sensor 316, a controller 317, and an energy-storing material 318. When light (e.g., sunlight) enters the transparent substrate 304, it is passed through to the attenuator 306, which reflects or otherwise blocks the incident light in the hot state so that it exits the material 300 through the transparent substrate 304. In the cold state, incoming light radiation is absorbed by the attenuator 306, which then heats up and re-emits the energy as long-wavelength infrared energy. Thus, the attenuator 306 also serves as a form of downconverter. When this energy is re-emitted by the attenuator/downconverter 306 in the cold state as infrared light, the energy then reflects off the transparent substrate 304 and is directed toward through the energy-storing material 118, which absorbs heat from the attenuator/downconverter 306 and re-releases it over a longer period of time. Alternatively, the energy may strike an optional mirror or broadband reflector 314, which reflects the energy back into the attenuator/downconverter 306 again. In this circumstance, infrared light is not able to escape from the attenuator/downconverter layer 306 and heating of the energy storing material 318 is accomplished through conduction alone. In this case, the geometry and composition of the device will generally be designed such that conduction occurs predominantly in a desired direction, with minimal leakage in the other direction.

Figure 4:
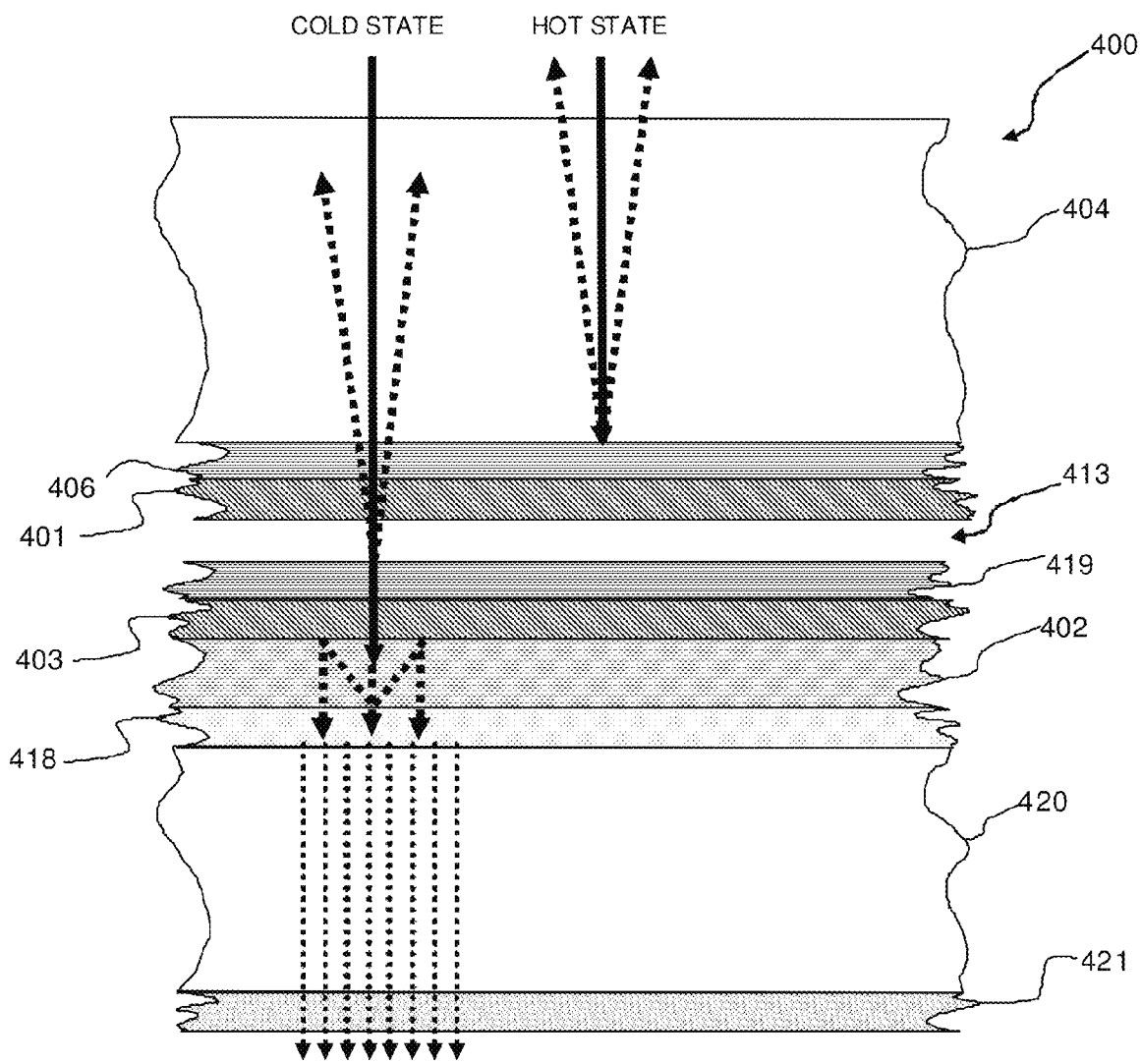
FIG. 4 is a schematic representation of an alternate embodiment of a building element that blurs the distinction between a window and a wall.

FIG. 4 depicts an exemplary "smart" building material in the form of a glass spandrel 400 for use in exterior cladding of buildings. The spandrel 400 employs a pane of ordinary window glass 404 adjacent a thermochromic attenuator 406. An interior surface of the thermochromic attenuator 406 may be coated with a low-emissivity film 401 that acts as a bandblock. A downconverter in the form of a blackbody radiator 402 is spaced apart from the thermochromic attenuator 406 to form an air gap 413. The air gap 413 serves as a transparent insulator as in a typical IGU. A second low-emissivity coating 403 covers the exterior surface of the blackbody radiator 402 to act as a bandblock. A second thermochromic attenuator 419 may optionally be inserted into the air gap 413 between the blackbody radiator 402 and the first thermochromic attenuator 406. The second thermochromic attenuator 419 (if used) may be in direct or indirect thermal contact with an energy-storing material 418 in order to respond to changes in the temperature of the energy-storing material.

A backplate 420 forms the interior surface of the spandrel 400. The backplate 420 may be another plate of glass or a sheet of plastic or metal. The backplate 420 is spaced apart from the downconverter 402 to form a gap. The gap may be filled with an energy storing phase-change material 418, for example, a wax or a salt, that is present to store and release thermal energy. The interior surface 421 of the backplate 420 may also be covered with an aesthetic surface treatment, for example, paint or thin stucco.

In operation, the first thermochromic attenuator 406 adjacent the glass 404 at the exterior side of the spandrel 400 may be chosen to have a transition temperature that blocks incident light when the ambient outside temperature is above 10° C., for example. In this way, the incident light does not pass through the spandrel 400 to heat the building on a moderately warm or hot day, thus reducing the cooling requirements for the building and conserving energy. However, when the ambient outside temperature is below 10° C., for example, the thermochromic attenuator 406 passes the incident light through the device to the downconverter 402. The downconverter 402 absorbs the incident light and emits energy at infrared wavelengths. The second low-emissivity coating 403 reflects the majority of the infrared energy emitted from the downconverter 402 and prevents this energy from exiting the spandrel 400 at the exterior of the building. Thus, most of the infrared energy emitted by the downconverter 402 is directed to the energy storing phase change material 418.

The phase change material 418 stores the infrared energy as thermal energy, which is transferred to the interior of the building via conduction through the backplate 420. As long as the interior temperature of the building is less than the temperature of the phase change material 418, thermal conduction will transfer heat from the phase change material 418 to the building. However, once the phase change material 418 fully melts, it is unable to absorb any additional thermal energy and will radiate any excess thermal energy to the building as the air gap 413 effectively forecloses significant thermal transfer to the exterior of the building. This thermal runaway condition may be acceptable until the interior of the building reaches a desired room temperature. However, without further control of the filter, the phase change material 418 in thermal runaway could overheat the building.

The second thermochromic attenuator 419 may optionally be provided to regulate the potential thermal runaway and prevent overheating of the building. In such an implementation, the transition temperature of the second thermochromic attenuator 419 may be chosen to be approximately room temperature, e.g., 20° C. Thus, below room temperature the second thermochromic attenuator 419 passes all incident light through to the downconverter 402 to heat the phase change material 418. Note that due to the air gap 413, the second thermochromic attenuator 419 is insulated from the ambient outside temperature and will only be heated through thermal conduction from the phase change material 418 and the interior of the building. However, once the interior of the building reaches room temperature and thus the phase change material 418 and the downconverter 402 are also at room temperature, the second thermochromic attenuator 419 transitions to block the incident light from reaching the downconverter 402, even in the cold state, and thus prevents thermal runaway and excess heating of the building interior.

Figure 5:
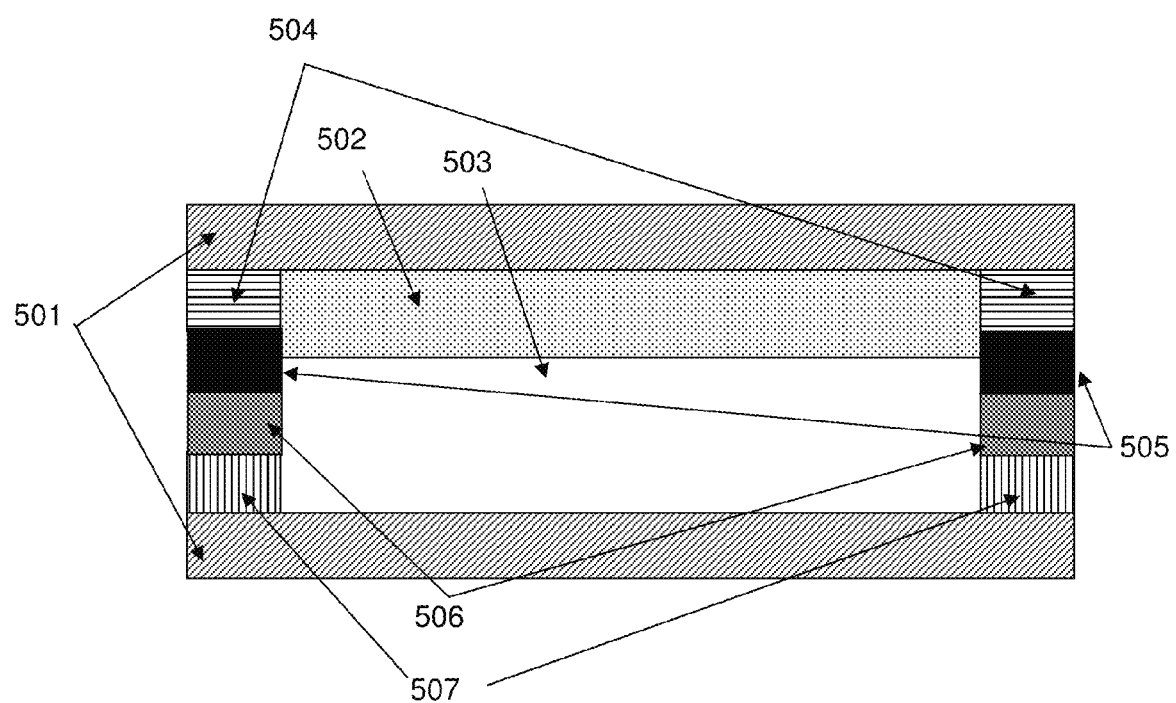
FIG. 5 is a simplified schematic representation of a multifunctional building component.

FIG. 5 depicts a simplified schematic form of a multifunctional building component 500. One or more structural element (501 support a color changing element 502, an insulation element 503, an energy harvesting element 504, an optional control element 505, an energy storage element 506, and an energy distribution element 507.

In one exemplary form, the structural element 501 may be a double-paned IGU comprising two panes of glass and an edge spacer (not pictured). In a particular embodiment, all of the other components are contained entirely within the IGU. For example, the color-changing element 502 may cover the inside surface of one pane of glass such that it is capable of acting as an optical attenuator to block or partially block incoming ambient light (e.g., unwanted solar heat gain), or as a display element or pixel to absorb and/or reflect incoming ambient light. All other components in this exemplary embodiment may be stacked or distributed around the perimeter of the IGU such that they do not interfere with a view through the glass. In another exemplary embodiment, the structural element 502 may be a display device, e.g., a liquid crystal display.

The color-changing element 502 may take a variety of forms, including a thermochromic, thermotropic, thermoreflective, thermodiffusive, electrochromic, electrotropic, electroreflective, electrodiffusive, magnetochromic, magnetotropic, magnetoreflective, magnetodiffusive, photochromic, phototropic, photoreflective, or photodiffusive optical filter. In a particular embodiment, the color-changing element is an electroreflective filter as described, for example, in U.S. Patent Application Publication No. 2009/0015902 to Powers et al. and is arranged such that in its reflective state it increases the amount of sunlight available to one or more photovoltaic collectors in the energy harvesting element 504. The color changing element 502 may be arranged in the form of a pattern to create a visual image on the building component 500, e.g., in the form of a sign or merely an aesthetic pattern.

The insulation element 503 may also take a variety of forms, including solid materials, foamed materials, air or other gases, and vacuum-filled spaces. In a particular embodiment, the insulation element consists of an air gap between the panes of a double-paned or multi-paned insulating glass unit, filled either with air, nitrogen, argon, or any mixture thereof, and sized so as to limit convective heat transfer as in a double-paned window. The IGU may also have a low-emissivity coating (not shown) on one or more faces to limit radiative heat transfer.

The energy harvesting 504 element may be photovoltaic, photochemical, thermoelectric, piezoelectric, or solar-thermal, or any combination thereof. Methods for harvesting energy from light, heat, temperature gradients, sound, and vibration are well known, well understood, and well described. Notably, in most climate zones, sunlight represents the single largest source of ambient energy that can be harvested without mechanical assistance. Therefore, in a particular embodiment the energy-harvesting element 504 may include one or more photovoltaic collectors arranged such that the color-changing element 502, in a reflective state, is capable of increasing the amount of sunlight available to be converted into electricity.

The control element 505 is an optional component of the multifunctional building component 500, as many embodiments—particularly those involving thermochromic, thermotropic, and thermoreflective color changing elements 502, passive solar thermal energy harvesting elements 504, and passive energy storage elements such as phase change materials or other thermal mass materials—do not require a control system in order to function. However, the presence of photovoltaic and electroreflective elements in embodiments implies that a control element 505, in the form of fairly standard electronic control circuitry, may also be needed.

The energy storage element 506 may be either active or passive in nature and may store energy electrically, chemically, mechanically, or thermally. For example, U.S. Patent Application Publication No. 2008/0210893 to McCarthy et al. discloses a heat-storing phase change material as a passive means of storing energy for later release. However, in an embodiment having the need to store energy gathered photovoltaically, the energy storage element 506 may take the form of a battery, capacitor, or fuel cell that is capable of taking in, storing, and releasing electrical energy under the influence of the energy harvesting element 504 and control element 505.

The energy distribution element 507 may also take a variety of forms. For passive embodiments that employ thermal mass or phase-change materials as the energy storage element 506, the energy distribution element 507 may in fact be the same object or element as the energy storage element 506. That is, a passive thermal mass is capable of releasing heat energy on its own, without additional mechanisms, and in fact will do so any time the temperature external to the thermal mass is lower than the temperature within it. For embodiments where the energy is harvested and stored as electrical energy, the most straightforward form of the energy distribution element 507 may simply be a pair of wires to carry the electrical energy to electrical systems external to the device 500. However, it may be advantageous to use the energy within the device 500 itself to perform one or more tasks or services that buildings and vehicles require including, for example, lighting, heating, and cooling. In a particular embodiment, the energy distribution element 507 may be or include a solid-state light emitter, such as an LED array, that makes use of stored electrical energy from the energy storage element 506 to illuminate the building interior or exterior when ambient light falls below a threshold value. In other embodiments where the energy harvesting element 504 may be or include a thermoelectric element that generates electricity from a temperature gradient between opposite faces, the thermoelectric energy harvesting element 504 can also serve as an energy distribution element 507, e.g., as a thermoelectric cooler or heater simply by changing the energy paths in the control element 505 (e.g., by means of internal or external switches). In another embodiment, wherein the energy harvesting element 505, the energy storage element 506, and the energy distribution element 507 may be a singular photoluminescent, e.g., luminescent or phosphorescent, material.

Numerous variations on the disclosed embodiments are also possible, by means of deleting, combining, or rearranging certain components. In addition, the components of various embodiments may be formulated from different materials or in different forms than those disclosed herein, so long as they perform an equivalent physical or chemical function.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as claimed below. Although various embodiments have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A multifunctional building component comprising
a structural element;
a color-changing element;
an insulation element to limit heat transfer; and
an energy-harvesting element, an optional energy storage element, and an energy distribution element.

2. The multifunctional building component of claim 1 further comprising an energy storage element.

3. The multifunctional building component of claim 1 further comprising an energy distribution element.

4. The multifunctional building component of claim 1, wherein the structural element is an insulating glass unit.

5. The multifunctional building component of claim 1, wherein the color-changing element is an absorptive material and a color of the color-changing element results from absorption of incident light by the absorptive material.

6. The multifunctional building component of claim 1, wherein the color-changing element is a reflective material and a color of the color-changing element results from reflection of incident light by the reflective material.

7. The multifunctional building component of claim 1, wherein the color-changing element is a diffusive material and a color of the color-changing element results from diffusion of incident light by the diffusive material.

8. The multifunctional building component of claim 1, wherein the color-changing element and the energy distribution element are combined into a single element of an energy radiating material and a color of the single element results from radiation of absorbed incident light by the energy radiating material.

9. The multifunctional building component of claim 1, wherein the energy-harvesting and energy-storing elements harvest and store electrical energy.

10. The multifunctional building component of claim 1, wherein the energy-harvesting and energy-storing elements harvest and store thermal energy.

11. The multifunctional building component of claim 1, wherein the energy-harvesting element and the energy-storing element are combined as a single photoluminescent material.

12. The multifunctional building component of claim 1, wherein the energy distribution element distributes electrical energy.

13. The multifunctional building component of claim 1, wherein the energy distribution element comprises an optical lighting system.

14. The multifunctional building component of claim 1, wherein the energy distribution element comprises a thermal radiator.

15. A multifunctional building component comprising
a structural element;
an insulation element capable of serving as a bandblock filter;
a color-changing element capable of serving as one or more of an optical attenuator, an optical downconverter, or an energy harvesting element;
an energy storage element for storage of light, heat, electrical, or vibration energy; and
an energy distribution element for distribution of light, heat, electrical, or vibration energy from the energy storage element, wherein
a color state of the color-changing element, under control of an external control signal, is used to regulate a flow of energy into the energy storage element and to regulate a release of energy through the energy distribution element in the form of heat, light, electricity, or vibration.

16. The multifunctional building component of claim 15, wherein the color-changing element is thermochromic.

17. The multifunctional building component of claim 15, wherein the color-changing element is electrochromic.

18. The multifunctional building component of claim 15, wherein the energy storage element and the energy distribution element are combined into a single element that stores and releases thermal energy.

19. The multifunctional building component of claim 15, wherein the external control signal is optical, electrical, magnetic, or thermal.

20. The multifunctional building component of claim 15, wherein the structural element is an insulating glass unit.

* * * * *